(12) United States Patent
Wang

(10) Patent No.: US 12,250,609 B2
(45) Date of Patent: Mar. 11, 2025

(54) METHOD AND APPARATUS FOR WIRELESS COMMUNICATION

(71) Applicant: Lenovo (Beijing) Ltd., Beijing (CN)

(72) Inventor: Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 409 days.

(21) Appl. No.: 17/784,825

(22) PCT Filed: Jan. 21, 2020

(86) PCT No.: PCT/CN2020/073575
§ 371 (c)(1),
(2) Date: Jun. 13, 2022

(87) PCT Pub. No.: WO2021/146936
PCT Pub. Date: Jul. 29, 2021

(65) Prior Publication Data
US 2023/0010676 A1    Jan. 12, 2023

(51) Int. Cl.
*H04W 4/021*      (2018.01)
*G01S 19/03*      (2010.01)

(52) U.S. Cl.
CPC .............. *H04W 4/021* (2013.01); *G01S 19/03* (2013.01)

(58) Field of Classification Search
CPC ..................................................... H04W 4/021
See application file for complete search history.

(56) References Cited

U.S. PATENT DOCUMENTS

| 6,504,503 | B1* | 1/2003 | Saint-Hilaire | .......... G01S 19/42 |
|---|---|---|---|---|
| | | | | 455/457 |
| 8,050,686 | B1* | 11/2011 | Souissi | ..................... G01S 5/12 |
| | | | | 455/67.11 |
| 2002/0119789 | A1* | 8/2002 | Friedman | .............. H04W 4/029 |
| | | | | 455/456.6 |
| 2011/0176523 | A1 | 7/2011 | Huang et al. | |
| 2017/0215119 | A1* | 7/2017 | Hong | .................. H04W 56/001 |

(Continued)

FOREIGN PATENT DOCUMENTS

| CN | 102204374 A | | 9/2011 | | |
|---|---|---|---|---|---|
| CN | 104378731 A | * | 2/2015 | .............. | H04W 4/02 |
| CN | 105023020 A | * | 11/2015 | ........... | G06F 16/355 |

(Continued)

OTHER PUBLICATIONS

Base station. (1999). Focal Dictionary of Telecommunications, Focal Press (1st ed.). Routledge. https://search.credoreference.com/articles/Qm9va0FydGljbGU6MTQzMTUwNg== (Year: 1999).*

(Continued)

*Primary Examiner* — Bernarr E Gregory
*Assistant Examiner* — Fred H Mull
(74) *Attorney, Agent, or Firm* — FIG. 1 Patents

(57) ABSTRACT

The present disclosure is related to methods and apparatuses. According to some embodiments of the disclosure, a method includes: receiving, at a user equipment, configuration information indicating zone area information, wherein the zone area information indicates at least one geographic zone; and determining, at the user equipment, that a Global Position System (GPS) function is denied.

20 Claims, 8 Drawing Sheets

(56) References Cited

U.S. PATENT DOCUMENTS

2018/0098299 A1     4/2018    Chae
2022/0394562 A1*   12/2022   Wang .................... H04W 36/32

FOREIGN PATENT DOCUMENTS

| CN | 107659915 | A | | 2/2018 | | |
|----|-----------|---|---|--------|---|---|
| CN | 107743311 | A | | 2/2018 | | |
| CN | 108024199 | A | | 5/2018 | | |
| CN | 110536234 | | | 12/2019 | | |
| GB | 2570853 | A | * | 8/2019 | ............ | H04W 4/021 |

OTHER PUBLICATIONS

Server. Free On-Line Dictionary of Computing, https://foldoc.org/server (Year: 2003).*

Base station. (2014). Collins English Dictionary (12th ed.). Collins. Credo Reference: https://search.credoreference.com/content/entry/hcengdict/base_station/0 (Year: 2014).*

What is the basic structure of a computer system? The Hutchinson Unabridged Encyclopedia with Atlas and Weather Guide. https://search.credoreference.com/content/entry/heliconhe/what_is_the_basic_structure_of_a_computer_system_what_are_the_three_main_elements_of_the_central_processing_unit/0 (Year: 2018).*

PCT/CN2020/073575 , "International Preliminary Report on Patentability", PCT Application No. PCT/CN2020/073575, Aug. 4, 2022, 6 pages.

PCT/CN2020/073575 , "International Search Report and Written Opinion", PCT Application No. PCT/CN2020/073575, Oct. 27, 2020, 7 pages.

202080090243.2 , "Foreign Office Action", CN Application No. 202080090243.2, Sep. 12, 2024, 15 pages.

* cited by examiner

METHOD AND APPARATUS FOR WIRELESS COMMUNICATION

TECHNICAL FIELD

The present disclosure generally relates to wireless communication technology, and more particularly to V2X (Vehicle-to-Everything) communications.

BACKGROUND

To expand the 3GPP (3rd Generation Partnership Project) platform to the automotive industry, standards for V2X services have been proposed and released. The concept of a zone has been introduced to V2X systems for efficient resource usage, range determination, and interference handling.

In some application scenarios, a geographical area may be divided into multiple rectangular areas, each of which may be referred to as a zone, and may be configured with a zone ID. A mapping between zones and resource pools may be configured. For example, each zone may be associated with a respective resource pool. When a User Equipment (UE) is located in a particular zone, the UE may preferentially select resources from the resource pool corresponding to the zone where the UE is currently located.

However, under certain circumstances, a UE may be unable to determine the zone in which the UE is currently located. There is a need for handling the determination of a current zone for a UE.

SUMMARY

Some embodiments of the present disclosure provide a method. The method may include: receiving, at a user equipment, configuration information indicating zone area information, wherein the zone area information may indicate at least one geographic zone; and determining, at the user equipment, that a Global Position System (GPS) function is denied.

In some embodiments of the present disclosure, the method may further include transmitting, to a base station, a message indicating a denial of the GPS function. The method may further include receiving, from the base station, a zone ID for the user equipment. The method may further include receiving, from the base station, a message instructing the user equipment to enter a default state.

In some embodiments of the present disclosure, the configuration information may further include parameters for triggering a report of a GPS state, and wherein the parameters include a value of a timer associated with a denial of the GPS function. The method may further include starting the timer in response to the determination that the GPS function is denied. The method may further include transmitting, to a base station, a message indicating a denial of the GPS function. The method may further include entering a default state in response to an expiry of the timer. The method may further include transmitting, to a base station, a message indicating that the user equipment has entered the default state in response to the expiry of the timer.

In some embodiments of the present disclosure, the method may further include: determining a zone ID for the user equipment according to a positioning method in response to the determination that the GPS function is denied; transmitting, to a base station, a message indicating the determined zone ID for the user equipment and a confidence level associated with the determined zone ID; and receiving, from the base station, a confirmation message indicating whether to perform zone operations according to the determined zone ID. The message may further indicate the positioning method for determining the zone ID for the user equipment. The method may further include: performing zone operations according to the determined zone ID when the confirmation message indicates an acknowledgement; or entering a default state when the confirmation message indicates a negative acknowledgement. In some embodiments of the present disclosure, the configuration information may further include a threshold for reporting zone ID, and transmitting the message indicating the determined zone ID may include transmitting the message indicating the determined zone ID when the positioning accuracy associated with the positioning method satisfies the threshold.

In some embodiments of the present disclosure, determining the zone ID for the user equipment may include: broadcasting a message indicating a denial of the GPS function; receiving a zone ID for a neighboring user equipment of the user equipment, wherein the neighboring user equipment is a paired sidelink user equipment of the user equipment; and determining the zone ID for the user equipment based on the zone ID for the neighboring user equipment.

In some embodiments of the present disclosure, determining the zone ID for the user equipment may include: determining the zone ID for the user equipment based on at least one of the following: historical GPS positioning information; moving speed of the user equipment; or route information.

In some embodiments of the present disclosure, determining the zone ID for the user equipment may include: requesting GPS information from a neighboring user equipment, wherein the neighboring user equipment is a paired sidelink user equipment of the user equipment; and determining the zone ID for the user equipment based on the GPS information from the neighboring user equipment and beamforming information between the user equipment and the neighboring user equipment.

In some embodiments of the present disclosure, entering a default state may include entering the default state when the user equipment is in a connected mode and has data to be transmitted. In some embodiments of the present disclosure, the default state may be associated with a default resource pool, and the method may further include performing transmission with resources assigned to the default resource pool after entering the default state.

Some embodiments of the present disclosure provide a method. The method may include: transmitting configuration information indicating zone area information. The zone area information may indicate at least one geographic zone.

In some embodiments of the present disclosure, the method may further include: receiving, from a user equipment, a message indicating a denial of the Global Position System (GPS) function; and transmitting, to the user equipment, a zone ID for the user equipment or a message instructing the user equipment to enter a default state.

In some embodiments of the present disclosure, the configuration information may further include parameters for triggering a report of the Global Position System (GPS) state. The parameters may include a value of a timer associated with a denial of the GPS function. In some embodiments of the present disclosure, the method may further include at least one of the following: receiving a message indicating a denial of the GPS function at a user equipment; or receiving a message indicating that a user equipment has entered a default state.

In some embodiments of the present disclosure, the method may further include: receiving a message indicating a zone ID for a user equipment and a confidence level associated with the zone ID; and transmitting a confirmation message to the user equipment in response to the message. The message may further indicate a positioning method for determining the zone ID for the user equipment. The confirmation message may include an acknowledgement to instruct the user equipment to perform zone operations according to the zone ID; or the confirmation message may include a negative acknowledgement to instruct the user equipment to enter a default state. In some embodiments of the present disclosure, the configuration information may further include a threshold for reporting a zone ID. The zone ID for the user equipment may be determined according to a positioning method and the positioning accuracy of the positioning method may satisfy the threshold.

Some embodiments of the present disclosure provide a method. The method may include: receiving, at a user equipment, a broadcast message indicating a denial of the Global Position System (GPS) function at a neighboring user equipment, wherein the neighboring user equipment is a paired sidelink user equipment of the user equipment; and transmitting a zone ID for the user equipment to the neighboring user equipment. The neighboring user equipment may be a paired sidelink user equipment of the user equipment.

Some embodiments of the present disclosure provide a method. The method may include: receiving, from a neighboring user equipment, a request for GPS information of a user equipment, wherein the neighboring user equipment is a paired sidelink user equipment of the user equipment; and transmitting the GPS information of a user equipment to the neighboring user equipment. The neighboring user equipment may be a paired sidelink user equipment of the user equipment.

Some embodiments of the present disclosure provide an apparatus. According to some embodiments of the present disclosure, the apparatus may include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G (NR), 3GPP LTE Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
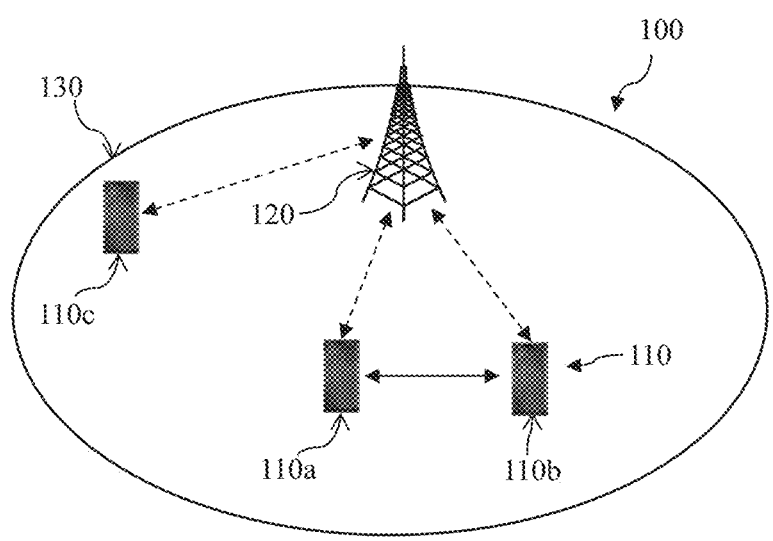
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the base station may support communication based on, for example, 3G, Long-Term Evolution (LTE), LTE-Advanced (LTE-A), New Radio (NR), or other suitable protocol(s). For example, the BS 120 may include an eNB or a gNB. The UE(s) 110 may include, for example, but is not limited to, a computing device, a wearable device, a mobile device, an IoT device, etc. In some embodiments of the present disclosure, the UE(s) 110 may be V2X UEs, for example, vehicles. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, the UEs 110 (e.g., UE 110a, UE 110b, and UE 110c) are within the coverage of the BS 120, which may not be a specific base station 120 shown in FIG. 1 and can be any one of the base stations 120 in a wireless communication system. For example, in the case that UE 110a is a V2X UE and the wireless communication system includes two base stations 120 with UE 110a being within the coverage of any one of the two base stations 120 means that UE 110a is within the coverage of a base station 120 (i.e., in-coverage) in the wireless communication system; and UE 110a being outside of the coverage of both base stations 120 means that UE 110a is out the coverage of a base station 120 (i.e., out-of-coverage) in the wireless communication system.

Still referring to FIG. 1, the UE 110a, UE 110b, and UE 110c may communicate with the BS 120 via, for example, a Uu link (denoted by dotted arrow in FIG. 1). In some other embodiments, some of the UE(s) 110, for example, UE 110b may be outside of the coverage of the BS 120. In this scenario, since the UE 110b is outside of the coverage of the BS 120, it cannot communicate with the BS 120 via a Uu link. UE 110a and UE 110b may communicate with each other via a sidelink (denoted by solid arrow in FIG. 1), for example, a PC5 interface as defined in 3GPP specification TS 23.303. In these embodiments, UE 110a may be referred to as a paired sidelink UE of UE 110b; and vice versa.

As mentioned above, the concept of a zone has been introduced to wireless communication systems for efficient resource usage, range determination, interference handling, and etc. Each zone may be identified by a corresponding zone ID and may be associated with a respective resource pool. Generally, a UE (e.g., UE(s) 110 in FIG. 1) may determine the zone (current zone) where the UE is currently located based on its location information from, for example, a GPS function equipped at the UE. The UE may select resources from a resource pool corresponding to the current zone to perform operations according to the corresponding zone configuration (zone operations). For example, the UE may perform transmissions according to the zone ID.

For example, in some embodiments of the present disclosure, a UE (e.g., UE(s) 110 in FIG. 1) may be configured with zone configuration information. The zone configuration information may include information that is necessary to acquire resource pool information allocated per zone. For example, the zone configuration information may indicate at least one geographic zone. Each geographic zone may be described by at least one of a width of the geographic zone and a length of the geographic zone. For example, a geographic zone may be 10 meters in width and 10 meters in length. In some embodiments, the zone configuration information may indicate the total number of zones that is configured with respect to longitude and the total number of zones that is configured with respect to latitude. In some embodiments, the zone configuration information may indicate respective resource pools associated with corresponding geographic zones (or zone IDs). In some embodiments, the zone configuration information may indicate a default resource pool. In some embodiments, the zone configuration information may be configured by a BS (e.g., BS 120 in FIG. 1) via a high layer (e.g., Radio Resource Control (RRC)) signal. In some other embodiments of the present disclosure, the zone configuration information may be pre-configured at a UE.

The UE may determine a zone ID based on the zone configuration information and its own location from, for example, a GPS equipped at the UE. The UE may then determine a resource pool corresponding to the zone ID based on the zone configuration information, and may perform zone operations, such as transmitting packets, with the resources in the determined resource pool. As the UE moves, the UE may re-determine its zone ID and the corresponding resource pool. In some embodiments of the present disclosure, only when zone function is enabled at the UE, the UE operates according to the zone configuration.

However, under certain circumstances (e.g., when a GPS function of a UE is denied due to, for example, the UE being under a bridge or in a tunnel or satellite failure), the UE may be unable to determine the zone in which the UE is currently located. There is a need for handling the determination of a current zone for a UE to maintain zone operations.

Embodiments of the present disclosure provide solutions for determine zone information (e.g., zone ID) for a UE. More details on the embodiments of the present disclosure will be illustrated in the following text in combination with the appended drawings.

Figure 2:
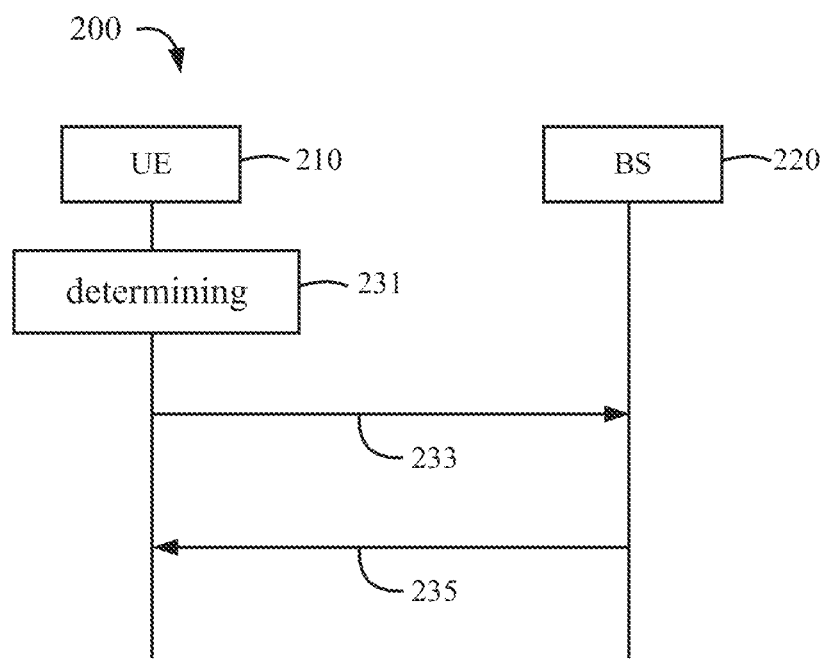
FIG. 2 illustrates a flow chart of an exemplary procedure for determining zone information for a UE according to some embodiments of the present disclosure.

FIG. 2 illustrates a flow chart of an exemplary procedure 200 for determining zone information for a UE according to some embodiments of the present disclosure.

The exemplary procedure 200 shows a procedure of a UE (e.g., UE 210) communicating with a base station (e.g., BS 220). In some examples, UE 210 may function as UE 110 in FIG. 1, and BS 220 may function as the BS 120 in FIG. 1.

As described above, UE 210 may determine a zone ID based on zone configuration information and its own location from, for example, a GPS equipped at UE 210. UE 210 may perform operations with resources in a resource pool corresponding to the zone ID. As UE 210 moves, UE 210 may re-determine the zone ID and the corresponding resource pool. However, under certain circumstances, a UE may determine that it cannot determine its location. For example, referring to FIG. 2, in operation 231, UE 210 may determine that a GPS function is denied for some reason. Since UE 210 cannot determine its location, it cannot acquire the resource pool corresponding to the zone where UE 210 is located.

In operation 233, UE 210 may transmit a message indicating a denial of the GPS function to BS 220. In some embodiments of the present disclosure, BS 220 may determine a zone ID for UE 210, and may transmit the zone ID for UE 210 at operation 235. UE 210 may then determine a resource pool corresponding to the zone ID from BS 220. In some other embodiments of the present disclosure, BS 220 may be unable to determine a zone ID for UE 210, and may transmit a message instructing UE 210 to enter (or fall back to) a default state at operation 235. The default state may be associated with a default resource pool. UE 210 may acquire resources from the default resource pool after it enters the default state. The default resource pool may be configured by a BS (e.g., BS 220) or may be pre-configured at a UE.

It should be appreciated by persons skilled in the art that the sequence of the operations in exemplary procedure 200 may be changed and some of the operations in exemplary procedure 200 may be eliminated or modified, without departing from the spirit and scope of the disclosure.

Figure 3:
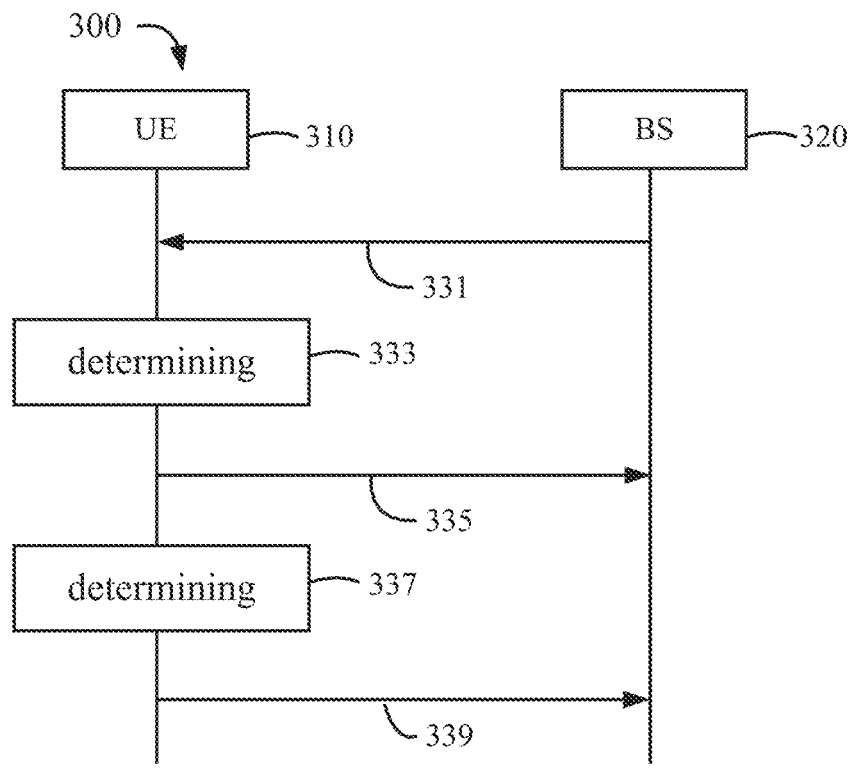
FIG. 3 illustrates a flow chart of an exemplary procedure for determining zone information for a UE according to some embodiments of the present disclosure.

FIG. 3 illustrates a flow chart of an exemplary procedure 300 for determining zone information for a UE according to some embodiments of the present disclosure.

The exemplary procedure 300 shows a procedure of a UE (e.g., UE 310) communicating with a base station (e.g., BS 320). In some examples, UE 310 may function as UE 110 in FIG. 1, and BS 320 may function as the BS 120 in FIG. 1.

Referring to FIG. 3, in operation 331, UE 310 may receive configuration information from BS 320. UE 310 may operate according to the configuration information. The configuration information may be transmitted along with or separate from the zone configuration information as described above. In some embodiments of the present disclosure, the configuration information may include parameters for triggering a report of GPS state. The parameters may include a value of a timer associated with a denial of the GPS function.

Under certain circumstances, UE 310 may determine that it cannot determine its location. For example, referring to FIG. 2, in operation 333, UE 310 may determine that a GPS function is denied for some reason. UE 310 may start a timer (e.g., timer #A) associated with a denial of the GPS function in response to the determination that the GPS function is denied. The timer may be set according to the above-mentioned configuration information.

In some embodiments of the present disclosure, the exemplary procedure 300 may include an optional operation for transmitting a message indicating a denial of the GPS function. For example, UE 310 may, in operation 335, transmit a message indicating a denial of the GPS function to BS 320 in response to the determination that the GPS function is denied.

In operation 337, UE 310 may determine that timer #A expires. UE 310 may enter a default state in response to the expiry of the timer #A. In some embodiments of the present disclosure, UE 310 may further determine that whether it can determine its own location or not (e.g., whether the GPS function is still denied) after timer #A expires, and may enter the default state if the location information still cannot be obtained. As mentioned above, the default state may be associated with a default resource pool, which may be configured by a BS (e.g., BS 320) or may be pre-configured at a UE. UE 310 may then acquire resources from the default resource pool after it enters the default state.

In some embodiments of the present disclosure, the exemplary procedure 300 may include an optional operation for transmitting a state of the UE to the corresponding base station. For example, UE 310 may, in operation 339, transmit a message indicating that UE 310 has entered the default state to BS 320 in response to the expiry of the timer or after UE 310 enters the default state.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
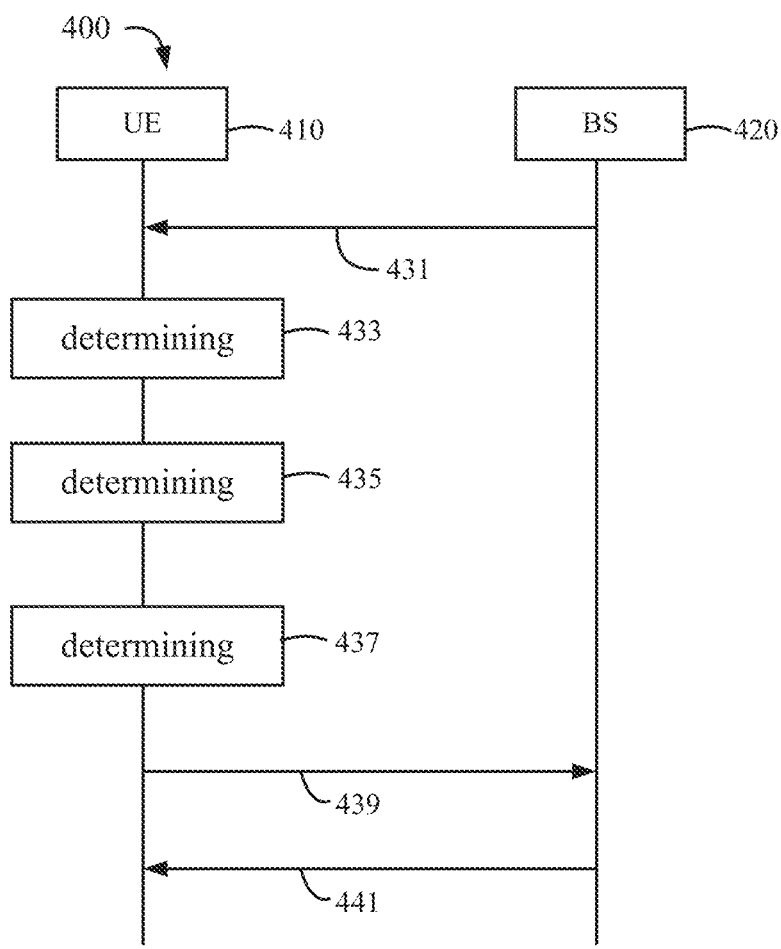
FIG. 4 illustrates a flow chart of an exemplary procedure for determining zone information for a UE according to some embodiments of the present disclosure.

FIG. 4 illustrates a flow chart of an exemplary procedure 400 for determining zone information for a UE according to some embodiments of the present disclosure.

The exemplary procedure 400 shows a procedure of a UE (e.g., UE 410) communicating with a base station (e.g., BS 420). In some examples, UE 410 may function as UE 110 in FIG. 1, and BS 420 may function as the BS 120 in FIG. 1.

As described above, UE 410 may determine a zone ID based on zone configuration information and its own location from, for example, a GPS equipped at UE 410. UE 410 may perform operations with resources in a resource pool corresponding to the zone ID. As UE 410 moves, UE 410 may re-determine the zone ID and the corresponding resource pool. However, under certain circumstances, a UE may determine that it cannot determine its location. For example, referring to FIG. 4, in operation 433, UE 410 may determine that a GPS function is denied for some reason. Since UE 410 cannot determine its location, it cannot acquire the resource pool corresponding to the zone where UE 410 is located.

In operation 435, UE 410 may determine a zone ID according to a positioning method in response to the determination that the GPS function is denied. UE 410 may employ various positioning methods for determining its zone ID. More details regarding the positioning methods will be further described in the following text. UE 410 may employ at least one positioning method to determine the zone ID when GPS function is denied.

In operation 439, UE 410 may transmit a message indicating the determined zone ID and a confidence level associated with the determined zone ID to BS 420 for confirmation. In some embodiments of the present disclosure, the message may further indicate the positioning method employed by UE 410 for determining the zone ID.

A confidence level may represent a reliability level of a result (e.g., the determined zone ID). The network entity (e.g., BS 420) may determine whether a result is applicable based on the associated confidence level. The confidence level can be represented in many different ways. In some examples, the confidence level can be represented as "high," "medium," or "low." In other examples, the confidence level can be represented as a numerical value (e.g., 95% or 90%) with different numerical values representing different confidence levels. Other techniques can also be used to represent the confidence or reliability in such a way that the respective confidence levels of different results can be compared.

For example, in the case that the confidence level is "high" or 95%, the network entity may determine that the result (e.g., the determined zone ID) is reliable; otherwise, the result may not be reliable. In some embodiments of the present disclosure, a network entity may determine that the result is reliable if the associated confidence level is equal to or greater than a threshold (e.g., 95%). Various factors, for example, the type of positioning method, may influence the confidence level.

In operation 441, UE 410 may receive from BS 420 a confirmation message indicating whether the determined zone ID is reliable. The confirmation message may indicate an acknowledgement (e.g., ACK) or a negative acknowledgement (e.g., NACK). UE 410 may perform zone operations according to the determined zone ID when the confirmation message indicates an acknowledgement. Otherwise, UE 410 may enter the default state when the confirmation message indicates a negative acknowledgement.

In some other embodiments of the present disclosure, when the confirmation message indicates a negative acknowledgement, UE 410 may employ a different positioning method to determine the zone ID and may transmit the determined the zone ID for confirmation. When UE 410 tries all possible positioning methods and the confirmation message still indicates a negative acknowledgement, UE 410 may enter the default state.

In some embodiments of the present disclosure, the exemplary procedure 400 may include optional operation(s) for determining whether to report the determined zone ID to BS 420 for confirmation. For example, in operation 431 (denoted by dotted arrow in FIG. 4), UE 410 may receive configuration information from BS 420. The configuration information may include a threshold for reporting zone ID. The threshold may be associated with a positioning accuracy. The configuration information may be carried in the same or a different message carrying the zone configuration information as described above.

In some embodiments of the present disclosure, for each positioning method, a corresponding positioning accuracy may be configured. In these embodiments, different positioning methods may correspond to different or same positioning accuracy. In some embodiments of the present disclosure, one single positioning accuracy may be configured for all types of positioning methods. In some embodiments, a BS (e.g., BS 420 in FIG. 4) may transmit positioning accuracy associated with at least one positioning method to a UE (e.g., UE 410 in FIG. 4). In some other embodiments of the present disclosure, positioning accuracy for each positioning method may be pre-configured at a UE.

In operation 437, UE 410 may determine whether the positioning accuracy of the positioning method used to determine the zone ID satisfies the threshold for reporting zone ID. In some embodiments of the present disclosure, when the positioning accuracy of the positioning method for determining the zone ID is greater than or equal to the threshold for reporting zone ID, UE 410 may, in operation 439, transmit the message indicating the determined zone ID to BS 420 for confirmation. Otherwise, when the positioning accuracy of the positioning method for determining the zone ID is less than the threshold, UE 410 may enter a default state.

In some other embodiments of the present disclosure, when the positioning accuracy of the positioning method for determining the zone ID is greater than or equal to the threshold, UE 410 may consider the determined zone ID is reliable, and may perform operations according to the determined zone ID, without transmitting the zone ID to BS 420 for confirmation.

It should be appreciated by persons skilled in the art that the sequence of the operations in exemplary procedure 400 may be changed and some of the operations in exemplary procedure 400 may be eliminated or modified, without departing from the spirit and scope of the disclosure.

In some embodiments of the present disclosure, a UE (e.g., UE(s) 110 in FIG. 1, UE 210 in FIG. 2, UE 310 in FIG. 3 or UE 410 in FIG. 4) may enter (or fall back to) the default state when the UE is in a connected mode and has data to be transmitted. If a UE is in an idle mode or an inactive mode or the UE does not have data to be transmitted, the UE may not enter the default state when a GPS function is denied at the UE or the UE is instructed to enter the default state. In some embodiments of the present disclosure, the default state is designed to handle the transmission of information (e.g., data, signaling, and so on) at a UE, instead of the reception of information. In other words, a UE may perform transmission with resources assigned to the default resource pool associated with the default state after entering the default state; however, the UE may still perform reception within a full range of resources.

Figure 5A:
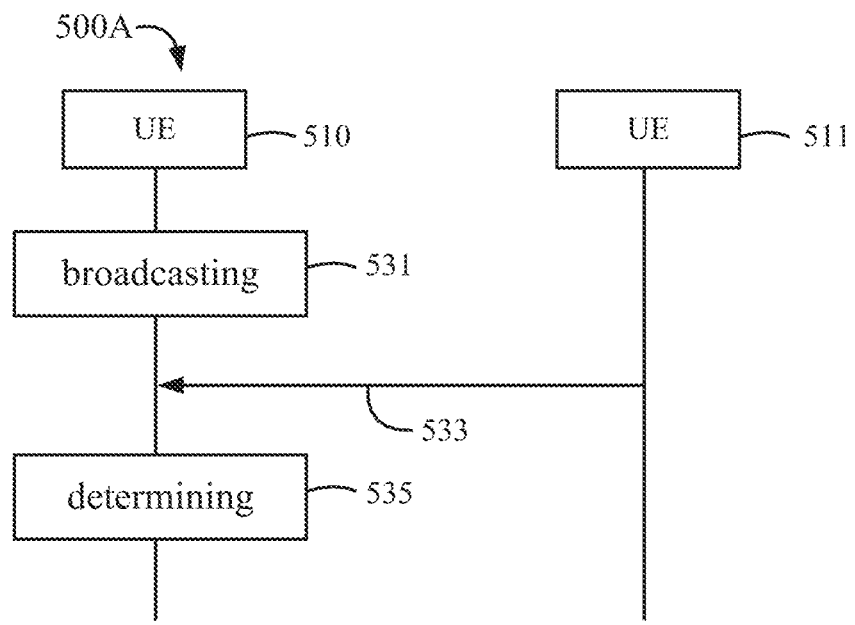
FIG. 5A illustrates a flow chart of an exemplary procedure for determining a zone ID for a UE according to some embodiments of the present disclosure.
Figure 5B:
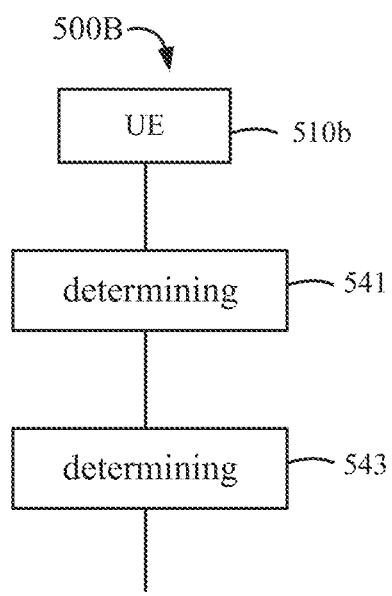
FIG. 5B illustrates a flow chart of an exemplary procedure for determining a zone ID for a UE according to some embodiments of the present disclosure.
Figure 5C:
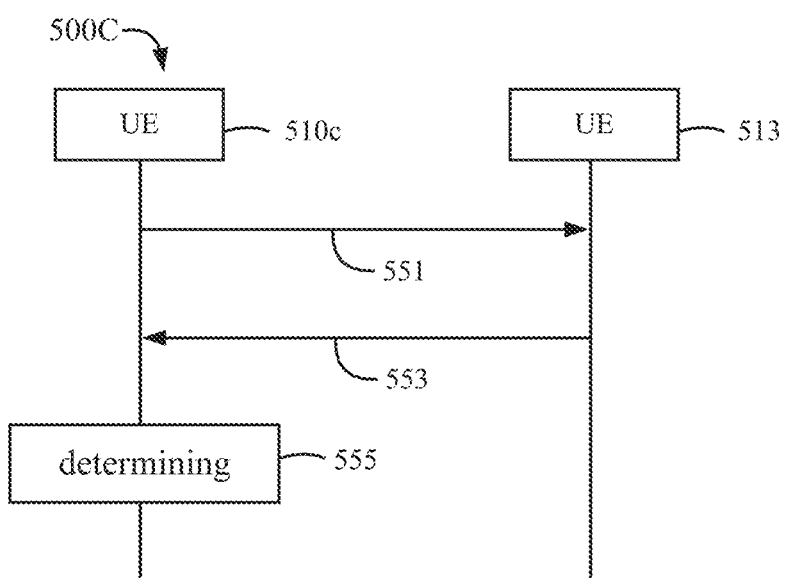
FIG. 5C illustrates a flow chart of an exemplary procedure for determining a zone ID for a UE according to some embodiments of the present disclosure.

As described above with respect to FIG. 4, various positioning methods may be employed by a UE for determining its zone ID when GPS function is denied. FIGS. 5A-5C illustrates exemplary procedures for determining a zone ID for a UE according to some embodiments of the present disclosure.

FIG. 5A illustrates a flow chart of an exemplary procedure 500A for determining a zone ID for a UE according to some embodiments of the present disclosure. The exemplary procedure 500A shows a procedure of a UE (e.g., UE 510*a*) communicating with another UE (e.g., UE 511). In some examples, UE 510*a* or UE 511 may function as UE 110 in FIG. 1 or UE 410 in FIG. 4. The exemplary procedure 500A is applicable to the above-mentioned procedure 400. Details described in all of the foregoing embodiments of the present disclosure are applicable for the embodiments shown in FIG. 5A.

As mentioned above, under certain circumstances, UE 510*a* may determine that it cannot determine its location. For example, UE 510*a* may determine that a GPS function is denied for some reason. Since UE 510*a* cannot determine its location, it cannot acquire the resource pool corresponding to the zone where UE 510*a* is located.

Referring to FIG. 5A, in operation 531, UE 510*a* may broadcast a message indicating a denial of the GPS function. UE 510*a* may broadcast the message according to a particular power level/range. The particular power level/range may allow a certain number or all of the neighboring UEs (e.g., paired sidelink UEs of UE 510*a*) to receive the broadcast message. In operation 533, the paired sidelink UEs (e.g., UE 511) of UE 510*a* may transmit its zone ID to UE 510*a* in response to the message. For example, referring back to FIG. 1, UE 110*a* may broadcast a message indicating a denial of the GPS function. UE 110*b* may be one of the paired sidelink UEs of UE 110*a*, and may transmit its zone ID to UE 110*a*.

Referring to FIG. 5A, in operation 535, UE 510*a* may determine its zone ID based on the zone ID received from neighboring UEs (e.g., paired sidelink UEs of UE 510*a*). For example, if a certain proportion (e.g., 70%) of the received zone IDs is the same, UE 510*a* may determine its own zone ID to be this zone IDs.

It should be appreciated by persons skilled in the art that the sequence of the operations in exemplary procedure 500A may be changed and some of the operations in exemplary procedure 500A may be eliminated or modified, without departing from the spirit and scope of the disclosure.

FIG. 5B illustrates a flow chart of an exemplary procedure 500B for determining a zone ID for a UE 510*b* according to some embodiments of the present disclosure. In some examples, UE 510*b* may function as UE 110 in FIG. 1 or UE 410 in FIG. 4. The exemplary procedure 500B is applicable to the above-mentioned procedure 400. Details described in all the foregoing embodiments of the present disclosure are applicable for the embodiments shown in FIG. 5B.

As mentioned above, under certain circumstances, UE 510*b* may determine that it cannot determine its location. For example, UE 510*b* may determine that a GPS function is denied for some reason. Since UE 510*b* cannot determine its location, it cannot acquire the resource pool corresponding to the zone where UE 510*b* is located.

Referring to FIG. 5B, in operation 541, UE 510*b* may determine its current GPS information (e.g., GPS location) based on at least one of the historical GPS positioning information, moving speed, or route information of UE 510*b*. In operation 543, UE 510*b* may determine its zone ID based on the determined GPS information.

It should be appreciated by persons skilled in the art that the sequence of the operations in exemplary procedure 500B may be changed and some of the operations in exemplary procedure 500B may be eliminated or modified, without departing from the spirit and scope of the disclosure.

FIG. 5C illustrates a flow chart of an exemplary procedure 500C for determining a zone ID for a UE according to some embodiments of the present disclosure. The exemplary procedure 500C shows a procedure of a UE (e.g., UE 510*c*) communicating with another UE (e.g., UE 513). In some examples, UE 510*c* or UE 513 may function as UE 110 in FIG. 1 or UE 410 in FIG. 4. The exemplary procedure 500C is applicable to the above-mentioned procedure 400. Details described in all the foregoing embodiments of the present disclosure are applicable for the embodiments shown in FIG. 5C.

As mentioned above, under certain circumstances, UE 510c may determine that it cannot determine its location. For example, UE 510c may determine that a GPS function is denied for some reason. Since UE 510c cannot determine its location, it cannot acquire the resource pool corresponding to the zone where UE 510c is located.

Referring to FIG. 5C, in operation 551, UE 510c may transmit a message to a paired sidelink UE (e.g., UE 513) of UE 510c to request GPS information of the paired sidelink UE. In some embodiments of the present disclosure, UE 510c may transmit the request to all its paired sidelink UEs. In some embodiments of the present disclosure, UE 510c may transmit the request to at least one of its paired sidelink UEs, which are selected according to certain criteria (e.g., the distance from UE 510c to the paired sidelink UE(s)). In some other embodiments of the present disclosure, UE 510c may broadcast the request according to a particular power level/range. The particular power level/range may allow at least one of the paired sidelink UEs of UE 510a to receive the broadcast request.

In operation 553, UE 510c may receive GPS information of a paired sidelink UE (e.g., UE 513) of UE 510c. In operation 555, UE 510c may determine its zone ID based on the GPS information from UE 513 and beamforming information between UE 510c and UE 513. The beamforming information between two UEs communicating via sidelink may include at least one of the direction, beam width or power of the beam for communicating between the two UEs. For example, UE 510c may determine its GPS information (e.g., GPS location) based on the GPS information from UE 513 and the beamforming information between UE 510c and UE 513. UE 510c may then determine its zone ID based on the determined GPS location.

It should be appreciated by persons skilled in the art that the sequence of the operations in exemplary procedure 500C may be changed and some of the operations in exemplary procedure 500C may be eliminated or modified, without departing from the spirit and scope of the disclosure.

Figure 6:
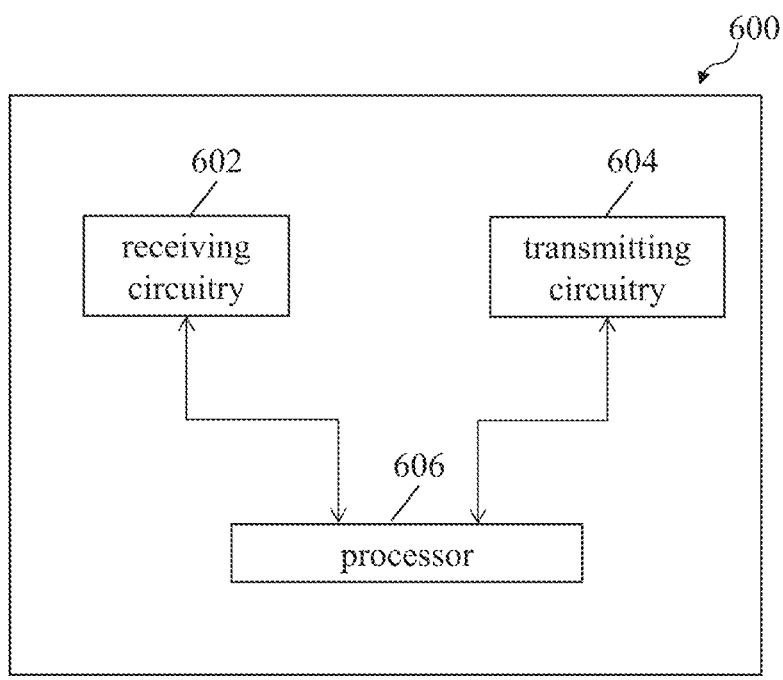
FIG. 6 illustrates a block diagram of an exemplary apparatus in accordance with some embodiments of the present disclosure.

FIG. 6 illustrates an example block diagram of an apparatus 600 according to some embodiments of the present disclosure.

As shown in FIG. 6, the apparatus 600 may include at least one non-transitory computer-readable medium (not illustrated in FIG. 6), a receiving circuitry 602, a transmitting circuitry 604, and a processor 606 coupled to the non-transitory computer-readable medium (not illustrated in FIG. 6), the receiving circuitry 602 and the transmitting circuitry 604. The apparatus 600 may be a BS or a UE.

Although in this figure, elements such as processor 606, transmitting circuitry 604, and receiving circuitry 602 are described in the singular, the plural is contemplated unless limitation to the singular is explicitly stated. In some embodiments of the present disclosure, the receiving circuitry 602 and the transmitting circuitry 604 are combined into a single device, such as a transceiver. In certain embodiments of the present disclosure, the apparatus 600 may further include an input device, a memory, and/or other components.

In some embodiments of the present disclosure, the non-transitory computer-readable medium may have stored thereon computer-executable instructions to cause a processor to implement the operations with respect to the UE as described above. For example, the computer-executable instructions, when executed, cause the processor 606 interacting with receiving circuitry 602 and transmitting circuitry 604, to perform the operations in FIGS. 1-5C.

For example, the processor 606 may determine that a GPS function is denied at the apparatus 600, and may determine zone information according to the procedures described above. In some other examples, the receiving circuitry 602 may receive a broadcast message indicating a denial of GPS function at a neighboring UE (e.g., a paired sidelink UE), and the transmitting circuitry 604 may transmit the zone ID of the apparatus 600 to the neighboring UE. In yet other examples, the receiving circuitry 602 may receive a request for GPS information of the apparatus 600 from a neighboring UE (e.g., a paired sidelink UE), and the transmitting circuitry 604 may transmit the GPS information of the apparatus 600 to the neighboring UE.

In some embodiments of the present disclosure, the non-transitory computer-readable medium may have stored thereon computer-executable instructions to cause a processor to implement the method with respect to the BS as described above. For example, the computer-executable instructions, when executed, cause the processor 606 interacting with receiving circuitry 602 and transmitting circuitry 604, to perform the operations in FIGS. 1-4.

For example, the receiving circuitry 602 may receive from a UE a message indicating a denial of GPS function. The transmitting circuitry 604 may transmit to the UE a zone ID for the UE or a message instructing the UE to enter a default state. In some other examples, the transmitting circuitry 604 may transmit configuration information indicating parameters for triggering a report of the GPS state. The parameters may include a value of a timer associated with a denial of the GPS function. In yet other examples, the receiving circuitry 602 may receive a message indicating a zone ID for a UE and a confidence level associated with the zone ID. The transmitting circuitry 604 may transmit a confirmation message to the UE in response to the message.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed is:

1. A user equipment (UE) for wireless communication, comprising:
at least one memory; and
at least one processor coupled with the at least one memory and configured to cause the UE to:
receive configuration information indicating a respective resource allocation associated with at least one geographic zone; and
transmit, based at least in part on a global position system (GPS) function associated with the at least one geographic zone being denied, a message that indicates a zone identifier of a geographic zone associated with the UE and a confidence level associated with the zone identifier, wherein the at least one geographic zone comprises the geographic zone associated with the UE.

2. The UE of claim 1, wherein the at least one processor is further configured to cause the UE to transmit a first additional message indicating the GPS function associated with the at least one geographic zone is denied.

3. The UE of claim 2, wherein the at least one processor is further configured to cause the UE to receive a second additional message that indicates the zone identifier of the geographic zone associated with the UE.

4. The UE of claim 2, wherein the at least one processor is further configured to cause the UE to receive an additional message instructing the UE to enter a default state.

5. The UE of claim 1, wherein the configuration information comprises parameters for triggering a report of a GPS state, and wherein the parameters include a value of a timer associated with the GPS function associated with the at least one geographic zone being denied.

6. The UE of claim 5, wherein the at least one processor is further configured to cause the UE to start the timer in response to the GPS function associated with the at least one geographic zone being denied.

7. The UE of claim 6, wherein the at least one processor is further configured to cause the UE to enter a default state in response to an expiry of the timer.

8. The UE of claim 7, wherein the at least one processor is further configured to cause the UE to transmit an additional message indicating that the UE has entered the default state in response to the expiry of the timer.

9. The UE of claim 1, wherein the at least one processor is further configured to cause the UE to:
determine the zone identifier of the geographic zone associated with the UE according to a positioning method; and
receive a confirmation message indicating whether to perform zone operations according to the zone identifier of the geographic zone associated with the UE.

10. The UE of claim 9, wherein to determine the zone identifier of the geographic zone associated with the UE, the at least one processor is configured to cause the UE to:
broadcast an additional message indicating the GPS function associated with the at least one geographic zone being denied;
receive an additional zone identifier for a neighboring UE, wherein the neighboring UE is a paired sidelink UE of the UE; and
determining the zone identifier for the UE based at least in part on the additional zone identifier for the neighboring UE.

11. A network equipment (NE) for wireless communication, comprising:
at least one memory; and
at least one processor coupled with the at least one memory and configured to cause the NE to:
transmit configuration information indicating a respective resource allocation associated with at least one geographic zone; and
receive, based at least in part on a global position system (GPS) function associated with the at least one geographic zone being denied, a message that indicates a zone identifier of the at least one geographic zone and a confidence level associated with the zone identifier.

12. The NE of claim 11, wherein the at least one processor is further configured to cause the NE to transmit, to the user a first additional message that indicates the zone identifier or a second additional message instructing a user equipment (UE) to enter a default state.

13. The NE of claim 11, wherein the configuration information comprises parameters for triggering a report of GPS state, and wherein the parameters comprise a value of a timer associated with the GPS function associated with the at least one geographic zone being denied.

14. The NE of claim 13, wherein the at least one processor is further configured to cause the NE to receive an additional message indicating that a user equipment (UE) has entered a default state.

15. The NE of claim 11, wherein the at least one processor is further configured to cause the NE to transmit a confirmation message in response to the message.

16. The NE of claim 15, wherein the message indicates a positioning method associated with the zone identifier.

17. The NE of claim 15, wherein:
the confirmation message comprises an acknowledgement (ACK) to instruct a user equipment (UE) to perform zone operations according to the zone identifier; or
the confirmation message comprises a negative ACK (NACK) to instruct the UE to enter a default state.

18. The NE of claim 15, wherein the configuration information comprises a threshold for reporting the zone identifier.

19. A method performed by a user equipment (UE), the method comprising:
receiving configuration information indicating a respective resource allocation associated with at least one geographic zone; and
transmitting, based at least in part on a global position system (GPS) function associated with the at least one geographic zone being denied, a message that indicates a zone identifier of a geographic zone associated with the UE and a confidence level associated with the zone identifier, wherein the at least one geographic zone comprises the geographic zone associated with the UE.

20. A processor for wireless communication, comprising:
at least one controller coupled with at least one memory and configured to cause the processor to:
receive configuration information indicating a respective resource allocation associated with at least one geographic zone; and transmit, based at least in part on a global position system (GPS) function associated with the at least one geographic zone being denied, a message that indicates a zone identifier of a geographic zone associated with the processor and a confidence level associated with the zone identifier, wherein the at least one geographic zone comprises the geographic zone associated with the processor.

\* \* \* \* \*